July 16, 1963  T. FESTO  3,097,796
APPARATUS FOR SPRAYING LAWNS, GOLF FAIRWAYS AND THE LIKE
Filed Aug. 31, 1961  2 Sheets-Sheet 1
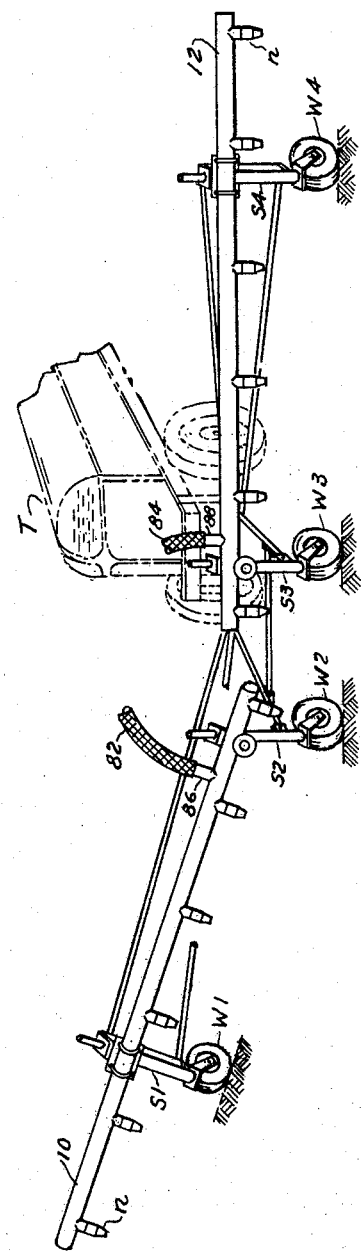
INVENTOR.
THOMAS FESTO
BY
JOHN W. HOAG

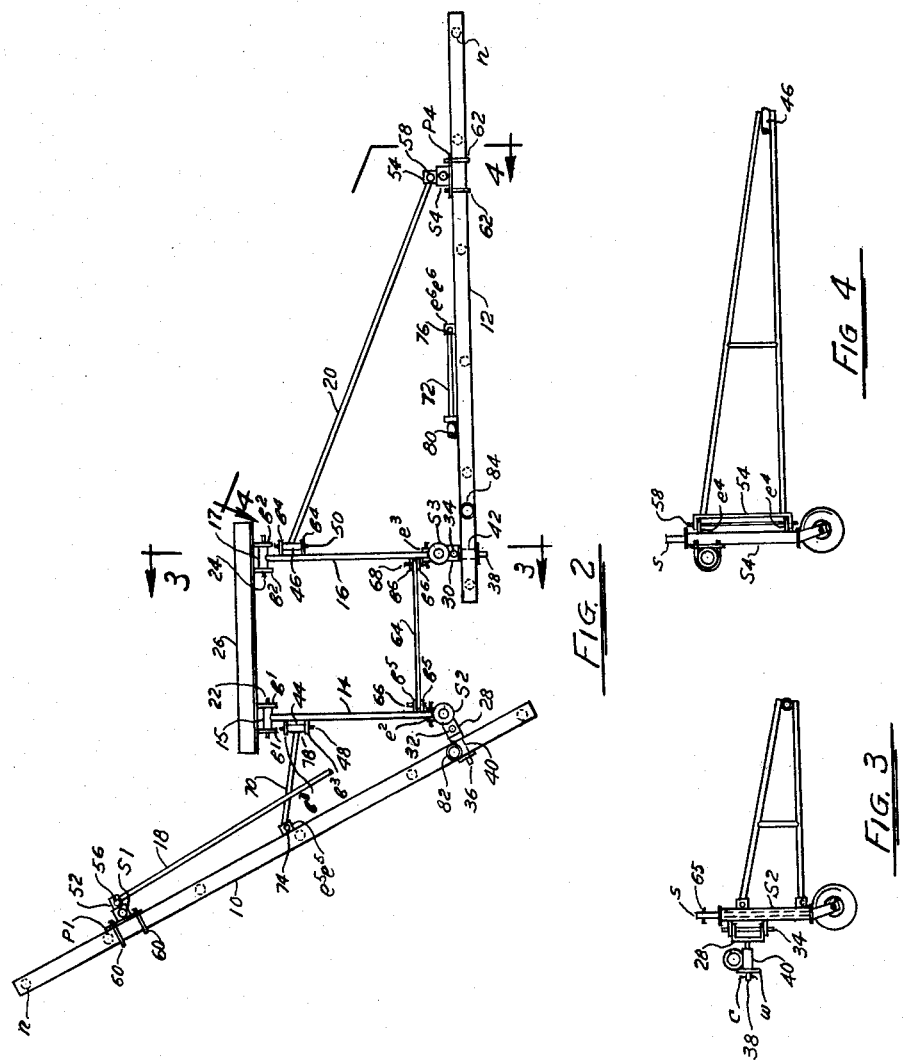

United States Patent Office 3,097,796
Patented July 16, 1963

3,097,796
APPARATUS FOR SPRAYING LAWNS, GOLF FAIRWAYS AND THE LIKE
Thomas Festo, 14 Greenwood Ave., Darien, Conn.
Filed Aug. 31, 1961, Ser. No. 135,252
7 Claims. (Cl. 239—167)

This invention relates to apparatus for spraying lawns, golf fairways and the like.

Apparatus of the prior art for this purpose has been unsatisfactory because in many cases the terrain to be sprayed is very rolling and uneven and the spray pipe means is not able to compensate for differences in elevation between portions of the terrain over which the spray pipe means is travelling, with the result that there is very uneven distribution of the spray solution.

An object of this invention is to provide improved support means for the spray pipe means of apparatus for spraying lawns, fairways and the like.

Another object of this invention is to provide spraying apparatus of the above mentioned kind which is adapted to conform itself to the terrain so as to keep all nozzles of the spray pipe means at substantially the same distance above the ground irrespective of differences in elevation between different portions of the ground over which the spray pipe means is moving.

Another object of this invention is to provide improved spray pipe support means such that the spray pipe means may be readily moved from a position in which a plurality of spray pipes are disposed and held in spaced substantially end-to-end relation, into a position in which the spray pipes are disposed and held at a decided angle one to the other on opposite sides of a tractor.

It will be understood that the term "tractor" is used herein broadly to include a truck or any other vehicle or power means by which the spray apparatus is propelled.

The invention will be best understood if the following description is read in connection with the drawings in which;

FIG. 1 is a perspective view of an embodiment of the invention connected to a tractor by which it is propelled, FIG. 2 is a top plan view showing one spray pipe in operative position and the other folded back, in position for travelling through narrow spaces, as for example over a bridge, FIG. 3 is a side elevational view of one of the arms connecting the spray pipe to a tractor, taken on the line 3—3 of FIG. 2, and FIG. 4 is a side elevational view of one of the links or braces between the outer ends of the spray pipes and the arms connecting and spacing them from the tractor, taken along the line 4—4 of FIG. 3.

In the embodiment of the invention illustrated in the drawings a pair of spray pipes 10 and 12 are pivotally mounted adjacent their inner ends at the forward end of arms 14 and 16 respectively, and are fixedly mounted adjacent their outer ends respectively at the forward ends of links or braces 18 and 20.

The arms 14 and 16 space the pipes 10 and 12 from the tractor T by which they are propelled, and the links or braces 18 and 20, when connected at their rear ends to the said arms respectively, hold the pipes in longitudinally aligned position.

At their inner ends the arms 14 and 16 have the transversely extending collars 15 and 17 respectively which are rotatable on the horizontal pivot pins 22 and 24, extending between the brackets $b^1b^1$ and $b^2b^2$ respectively which project forwardly from the cross bar 26 which is supported in any convenient way by the chassis of the tractor.

At their outer ends the arms 14 and 16 are fixedly connected to the sleeves $S_2$ and $S_3$ which in turn are pivotally connected to the pipes 10 and 12 respectively by a combination of vertically and horizontally extending pivots. Channel brackets 28 and 30 are pivotally mounted on vertical pivot pins 32 and 34 which extend between the ears $e^2$, $e^2$ and $e^3$, $e^3$ which project forwardly from sleeves $S_2$ and $S_3$ respectively. And projecting forwardly and horizontally from channel brackets 28 and 30 are pivot pins 36 and 38 on which are rotatably mounted the collars 40 and 42 respectively which are welded to the underside of pipes 10 and 12 respectively and extend transversely of the pipes. The collars 40 and 42 are retained on the pivot pins 36 and 38 by washers $w$ and cotter pins $c$.

At their inner ends the links 18 and 20 have the angularly disposed collars 44 and 46 respectively which are rotatably mounted on the horizontally extending removable pivot pins 48 and 50 extending between the outwardly extending pairs of brackets $b^3$, $b^3$ and $b^4$, $b^4$ respectively.

At their outer ends the links 18 and 20 are fixedly connected to the channel brackets 52 and 54 which are pivotally mounted on vertically extending pivot pins 56 and 58 which extend between the pairs of ears $e^1$, $e^1$ and $e^4$, $e^4$ projecting rearwardly from the sleeves $S_1$ and $S_4$ respectively.

Welded on the front of sleeves $S_1$ and $S_4$ are the plates $p_1$ and $p_4$ respectively which anchor the U-bolts 60, 60 and 62, 62 by which the pipes 10 and 12 respectively are fixedly engaged to and supported on the said sleeves.

The sleeves $S_1$, $S_2$, $S_3$ and $S_4$ receive the upwardly extending shanks $s$ of wheel assemblies $W_1$, $W_2$, $W_3$ and $W_4$ respectively. The wheel assemblies are preferably of castor type, each comprising an axle engaged by a U-bracket or clevis from the top of which a shank $s$ extends vertically. The shanks $s$ are rotatable within sleeves $S_1$, $S_2$, $S_3$ and $S_4$ so that each can turn through 360°. As illustrated, the shanks are longer than the sleeves, permitting some relative movement vertically between the shanks and the sleeves, such movement being limited by the abutment means 65 which, in the form illustrated herein, is a cotter pin.

The arms 14 and 16 are interconnected adjacent their forward ends by the cross rod 64 which is pivotally connected to said arms respectively on the horizontal pivot pins 66 and 68 which extend between inwardly extending pairs of brackets $b_5b_5$ and $b_6b_6$ respectively.

The outer end of each pipe is fixed with respect to its outer wheel member, except for a limited amount of play of the shank of the wheel support vertically in its sleeve, and thus will follow the wheel down into a depression or up over an elevation, and the pipe asemblies individually will rotate in vertical planes around the pivot pins 36 and 38 respectively, with the result that the pipe members 10 and 12, while disposed end to end in the same vertical plane, may assume entirely different angles in that plane. Since the arms 14 and 16 are mounted on horizontal pivots at both ends they will compensate for differences in elevation of the terrain between the tractor and the spray apparatus, and because the arms are interconnected by a cross bar pivoted on horizontal pivots at both ends each spray member may move up or down relative to the other. The links 18 and 20 compensate for differences in elevation of the terrain between the tractor and the outer ends of the spray pipes respectively. Because of the combination of pivotal connections disclosed herein the device is self accommodating to differences in elevation of the terrain.

When it is desired to move the spraying apparatus along a road or through a narrow space, such as a bridge, the inner ends of the links 18 and 20 are detached from the arms 14 and 16 respectively and the outer ends of the pipes 10 and 12 are swung on pivots 32 and 34 to a position in which they extend along either side of the tractor and require very little more space than the width of the tractor itself. For holding the pipe lengths in the folded back position, a pair of short links 70 and 72 are provided, pivotally mounted at one end on pipes 10 and 12 on vertically extending pivots 74 and 76 which extend between pairs of ears $e^5 e^5$ and $e^6 e^6$ which are welded to pipes 10 and 12 respectively. The other ends of the short links are provided with collars 78 and 80 adapted to be engaged by the pivot pins 48 and 50 between the brackets $b^3$, $b^3$ and $b^4$, $b^4$ described above in connection with links 18 and 20.

Nozzles $n$ are provided at spaced intervals along the pipes 10 and 12 and preferably the inner ends of the pipes are spaced apart so that the nozzle adjacent the inner end of one pipe will be spaced from the nozzle adjacent the inner end of the other nozzle by this same interval. To accomplish this, the inner ends of the pipe may be spaced apart a distance equal to one half said interval and the nozzles nearest the inner ends of the pipes respectively each spaced from the inner ends of the pipes a distance equal to one quarter of said interval.

It is immaterial to this invention how the liquid to be sprayed is supplied to the spray pipes provided the means does not interfere with the flexibility of this apparatus and its ability to conform to the terrain. As shown herein, the flexible conduits 82 and 84 which may be connected to any suitable source of supply are connected to the couplings 86 and 88 carried by the pipe members adjacent to their respective inner ends.

There has thus been provided a spraying apparatus in which the above mentioned objects have been accomplished in a thoroughly practical manner.

What is claimed is:

1. Apparatus for spraying lawns, golf fairways and the like comprising, two spray pipes and means for supporting them and connecting them to a tractor including, a pair of arms, means for securing the inner ends of the arms to a tractor including pivot means permitting the arms to swing up and down independently in vertical planes, vertically disposed sleeves carried at the other end of the said arms, and means for interconnecting the sleeves to the said pipes adjacent their inner ends including a combination of vertically and horizontally extending pivots, the pipes being rotatable in a vertical plane around said horizontal pivots respectively, a pair of links adapted to co-act with the arms to hold the spray pipes in longitudinal alignment when in operative position, means for securing the inner end of the links to the arms respectively including pivot connection means permitting the links to swing up and down in vertical planes, vertically extending sleeves carried by said links at their outer ends respectively, means for pivotally connecting the outer ends of the links to the said sleeves for relative swinging movement around vertically disposed pivots, means for attaching the pipes adjacent their outer ends to the sleeves carried by said links respectively, wheel assemblies including vertically extending shanks which are received in the sleeves carried by said arms and by said links respectively and are rotatable therein, and a tie rod extending between said arms and interconnected at either end to said arms respectively by horizontally extending pivot pins.

2. The apparatus claimed in claim 1 wherein the shanks of the wheels are longer than the sleeves in which they are received whereby the wheel assemblies can move up and down within and relative to the sleeves individually, and stop means for each shank preventing it from being inadvertently dislodged from its sleeve.

3. The apparatus claimed in claim 1 including a pair of links pivotally mounted at one end to the said pipes respectively for swinging movement in a horizontal plane and each having means including horizontally extending pivot pins for engagement with the said arms when the spray pipes are swung into angularly disposed inoperative position.

4. Apparatus for spraying lawns, golf fairways and the like, mounted on its own wheel supports and adapted to be propelled by a tractor, including, a pair of arms and means for pivotally connecting their rear ends respectively to a tractor to permit swinging movement of said arms individually in vertical planes, a pair of spray pipes, and wheel support means for supporting each of said pipes adjacent its outer and inner ends respectively, said arms having at their outer ends respectively vertically disposed sleeves, and the wheel support means for the inner ends of said pipes respectively, including wheel shank means adapted to be received in said sleeves respectively, and horizontally disposed pivot means projecting forwardly from said sleeves respectively on which the inner ends of said pipes are pivotally mounted for rotation in a vertical plane.

5. The apparatus claimed in claim 4 including means for holding said spray pipes in end to end aligned relation.

6. The apparatus claimed in claim 4 including means for holding said spray pipes in angularly disposed relation with the outer ends of the pipe extending rearwardly and adapted to extend along opposite sides of a tractor to which said arms are connected.

7. Apparatus for spraying lawns, golf fairways and the like, mounted on its own wheel supports and adapted to be propelled by a tractor including, a pair of arms and means for pivotally connecting their rear ends respectively to a tractor to permit swinging movement of said arms individually in vertical planes, a pair of spray pipes and wheel support means for supporting each of said pipes adjacent its outer and inner ends respectively, said arms having at their outer ends respectively vertically disposed sleeves and the wheel support means for the inner ends of said pipes including wheel shank means adapted to be received in said sleeves respectively, horizontally disposed pivot means projecting forwardly from the sleeves which are at the outer ends of said arms respectively on which the inner ends of said pipes are pivotally mounted for rotation in a vertical plane, and tie rod means extending between said arms intermediate their ends, and pivotally connected to said arms respectively on horizontally extending pivots.

References Cited in the file of this patent

UNITED STATES PATENTS

| | | |
|---|---|---|
| 2,539,288 | Van Horn | Jan. 23, 1951 |
| 2,575,521 | Ireland | Nov. 20, 1951 |
| 2,657,949 | Morrison | Nov. 3, 1953 |